Oct. 26, 1965    L. A. BAKER ETAL    3,214,766
CONSUMER SELF-READER METER AND ENCODING DEVICE
Filed July 2, 1963
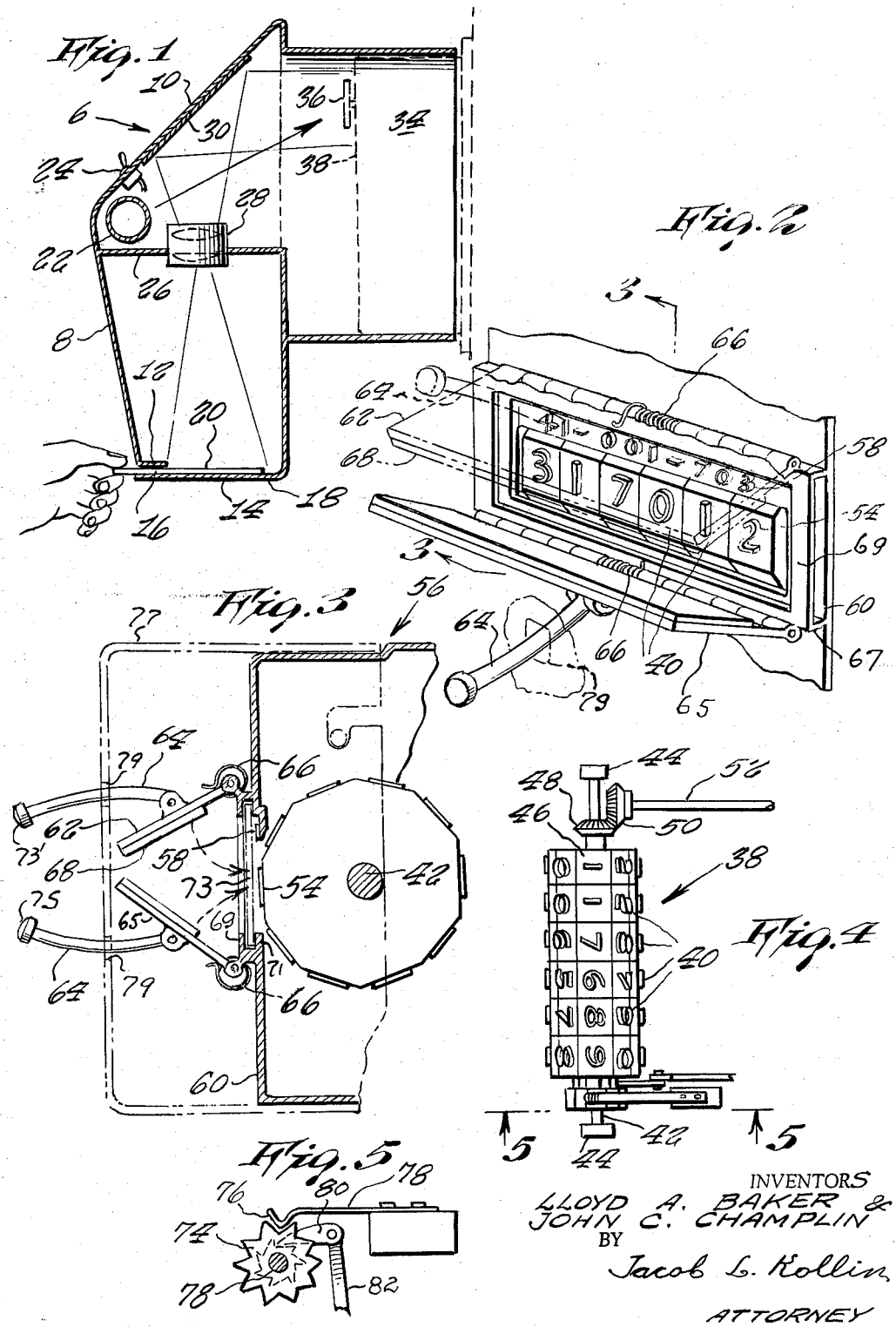
INVENTORS
LLOYD A. BAKER &
JOHN C. CHAMPLIN
BY
Jacob L. Kollin
ATTORNEY

United States Patent Office 3,214,766
Patented Oct. 26, 1965

3,214,766
CONSUMER SELF-READER METER AND
ENCODING DEVICE
Lloyd A. Baker, 55 W. 46th St., New York 36, N.Y., and
John C. Champlin, 99 Old Tarrytown Road, White
Plains, N.Y.
Filed July 2, 1963, Ser. No. 292,413
4 Claims. (Cl. 346—95)

This invention relates to recording devices in general, and in particular to devices for recording by a consumer himself of the readings of meters such as electric, gas, steam, water employed by utility companies at the consumer's premises. The invention is further directed to such devices which may be employed for recording by a consumer of the readings of other types of meters which are not employed at the consumer's premises proper as for example self-service gasoline fuel pumps employed at service stations and the like.

It is customary for utility companies to employ readers who make periodic inspections and manual recordings of the consumption of electricity, gas or other services at the consumer's premises. Due to the considerable number of readers employed by the utility companies for this purpose, particularly in large cities, substantial overhead costs are added to the operation.

In addition the readings are not always accurate and no permanent record is made which would enable the consumer himself to verify the accuracy of the readings.

The present invention therefore has for its objects the provision of consumer self-reader and meter recording devices which will overcome the above disadvantages.

An important object of the invention is to provide devices which will record by printing or photographic means a permanent record of the particular meter reading.

Another important object of the invention is to provide such devices which can be operated by the consumer himself without the employment of a reader.

A further object of the invention is to provide a meter reading and recording device which imprints the meter data in magnetic ink on a suitable card, while at the same time providing a visible readable record for the consumer.

Still another object of the invention is to provide a meter data recording device which employs photographic means for making a permanent record of the meter reading.

Yet another object of the invention is to provide devices of the above type which will automatically encode the meter data in such a manner that it may be read, sorted, calculated and billed automatically by high speed electronic automated machines.

Another object of the invention is to provide devices of the above character which can be easily adapted to be used with existing meters, requiring at most only slight modifications of the latter.

A further most important object of the invention is to effect a drastic and substantial reduction in the overhead of utility companies by obviating personnel required to read, sort, calculate and bill the consumer and using instead such encoding and processing by high speed electronic automated machines.

Still another object of the invention is to provide devices of the above character which are accurate, tamper-proof and fast in operation are simple and relatively inexpensive in construction and which may be operated by a consumer without previous instruction.

These and other important objects of the invention will become apparent from the following description and the accompanying drawing forming part of the specification. It is to be understood, however, that the invention is not limited to the embodiments disclosed and may be varied with regard to shape, size and elements therein without restriction of the broad principle of the invention.

In the accompanying drawings:
FIG. 1 is an elevational cross-section of the device,
FIG. 2 is a front perspective view of another embodiment of the device,
FIG. 3 is a cross-section taken on line 3—3 of FIG. 2,
FIG. 4 is a plan view of part of the adapter mechanism and
FIG. 5 is a partial view of the mechanism as viewed in the direction of line 5—5 of FIG. 4.

Referring now to the drawing in detail the adapter, generally indicated by the numeral 6 in FIG. 1, comprises a light-proof housing formed with a downwardly extending casing portion 8, an oblique top portion 10, an inwardly directed flange 12 and a supporting plate 14 spaced from the flange a short distance to form a narrow slot 16, through which may be inserted a light-sensitive card 18 having a photographic emulsion side 20. The casing 8 is provided with an electric lamp 22 operable by a switch 24 which is of the self-extinction type well known in the art and which may be preset for any desired time exposure. Light is separated from the lower part of casing 8 by a horizontal wall in which is mounted a lens assembly 28. The oblique portion 10 of the casing is provided with a mirror. The casing 8 is formed with an integral cylindrical sleeve which is adapted to engage over the meter mechanism in the place of the original transparent cover usually employed for electric meters. The sleeve may, however, be of any desired shape or cross-section so that it will fit over similar metering mechanisms of gas, water and other types of meters. The entire housing 6, is preferably molded of opaque plastic, so that it is light-proof, at the same time being inexpensive to manufacture.

To record a reading, the light-sensitive card is inserted in the slot 16 with the sensitive face 20 on top or facing the lens assembly 20. Lamp 20 is turned on by means of switch 24, thereby illuminating the dials 36 of the meter and the meter's number which is usually imprinted on the face plate 38 of the meter.

The light reflected from the face plate and the dials by mirror 30 passes through lens assembly 28 and strikes the photographic emulsion 20 thus recording the reading on a given date, which may be filled in by the consumer. The card 18, thus exposed is placed in an opaque envelope which may be provided by the utility company, and mailed to the latter for processing.

In the embodiment shown in FIGS. 2–5, an indicating mechanism 38 is used to replace the usual meter mechanism which employs disks imprinted with the unit numbers. This mechanism comprises a plurality of adjacent multi-sided indicator wheels 40 rotatably mounted on a shaft 42 supported in bearings 44. The wheels are interengaged in a manner well known in the meter-register art and to one of the wheels, 46, is secured a bevel gear 48 which engages with bevel gear 50 which may be mounted on the existing shaft 52 of a meter (not shown) or which may already be present thereon.

The multi-sided wheels 40 are provided with numerals 54 projecting in relief and the adapter housing 56, for the particular type of meter, is further provided with a customer's meter number 58 projecting in relief. Pivotably mounted on the face plate 60 are a pair of pads 62, 65 normally biased in the open position by means of springs 66.

Pad 62 is provided with an absorbent cushion 68, which is saturated with magnetic ink of any desired color, so that the ink may be employed to make a visible record and the magnetic particles therein can also be used to affect the scanning mechanism of a suitable electronic recording or calculating machine well known in the corresponding art.

Pad 65 is used to press card 67, furnished by the utility company, against the numerals which have been previously saturated with magnetic ink by the cushion 68 of pad 62.

The front plate 60 of the device is formed with a guide frame 67, having spaced flanges 69, 71 to permit the insertion of a card 73, shown in dotted lines in FIG. 3, on which the record is to be printed. It will be noted that flange 71 is spaced from the faces of numerals 54, 58, just enough to prevent contact between the card 73 and these numerals and thus the smearing of card 73 when it is inserted or removed.

To prevent tampering with the device and to keep dirt and dust from entering the mechanism, there is provided a cover 77 preferably of transparent material having apertures 79 shown in dotted lines in FIG. 3, for the passage of levers 64, 64'. Cover 77 may be secured to the device by appropriate means to prevent tampering by unauthorized persons.

In operation, the utility consumer presses the inking pad handle 64, which may appropriately be labeled on knob 73' with the legend "Press Ink," in the direction of the arrow thus bringing in contact this pad with the numerals 54 and 58 and thereby applying the magnetic ink to the numerals. After releasing pad 62, which returns to its normal position due to the bias of spring 64, the consumer presses lever 64' in the direction of the arrow, thus contacting the card with the inked numerals 54, 58 thereby impressing the meter reading as well as the meter number on the card. An appropriate space for the date may be provided on the card and this may be filled in by the consumer before mailing the card with the magnetic ink imprint to the consumer before mailing the card with the magnetic ink imprint to the utility company for processing. The lever 64' may likewise be labeled with a direction legend such as "Press Print" on knob 75.

To obtain an exact reading in full, rather than partial numerals the recording device is provided with an intermittent snap device which causes the multi-sided wheels to instantaneously snap into a stationary position for reading and to remain in this position until the next number on the particular wheel is to appear. This intermittent snap device comprises a star wheel 74 secured to the shaft 42 and held stationary by the bent portion 76 of a leaf spring 78.

Another, smaller toothed wheel 78 is secured to shaft 42 and is actuated by a pawl 80 operable by a lever 82 operable in known manner through appropriate linkage by the meter's mechanism (not shown).

As already mentioned above, the consumer, after recording the meter reading encloses the record card with his check for the previous month's billing in a suitable envelope and mails it to the utility company for processing.

While the broad concept of the invention has been illustrated in connection with home utility meters, it will be appreciated that the invention is not limited to such use only but may be employed with metering devices which are not on the consumer's premises, such as self-service gasoline dispensing pumps and many other devices of similar nature.

Having thus described our invention what we claim and desire to protect by Letters Patent of the United States is:

1. A consumer self-reader meter device comprising in combination a plurality of interengaging aligned prismatic drums provided with raised printing characters, a shaft for advancing said drums, a first bevel gear secured to one end of said shaft, a second bevel gear adapted to be mounted on a meter drive shaft for engaging with said first bevel gear, a casing for mounting said shaft and said drums on a meter and adapted to mount the device on a meter, said casing having a front wall provided with an opening for exposing a row of said raised printed characters, a guide frame secured outwardly of said front wall in the area of said spaced opening, spaced from said printing characters, said guide frame comprising upper and lower angular flanges, a rectangular record card adapted to be received in said guide frame, a first inking pad saturated with magnetic ink containing a visually discernible pigment for inking said raised characters, said pad being pivotable to said upper flange, a pressure platen pivotable to said lower flange for displacing the card into contact relationship with said raised printing characters, means normally biasing said pads outwardly of said opening, a pair of levers secured to each of said pads respectively for pivoting said pads and a casing of transparent material secured to said housing, said casing having an end wall spaced from said housing's front wall, said end wall having vertical slotted openings, said levers extending through said openings and being vertically displaceable therethrough.

2. The device according to claim 1, further provided with an intermittent snap device for causing the multi-sided wheels to instantaneously snap into a stationary position to prevent blurring of the impressions on the card.

3. The device according to claim 1, further provided with a predetermined meter number above said indicator numerals, said number consisting of three-dimensional relief numbers projecting from said plate.

4. The device according to claim 1 the side of said casing having a slotted opening aligned with said frame to permit the insertion and removal of said record card through said slot.

References Cited by the Examiner

UNITED STATES PATENTS

| | | | |
|---|---|---|---|
| 1,305,778 | 6/19 | Cushing et al. | 101—269 |
| 2,018,015 | 10/35 | Fahrney | 346—107 |
| 2,429,947 | 9/47 | Potts | 346—107 |
| 2,524,299 | 10/50 | Sutherland | 346—78 |
| 2,789,028 | 4/57 | Von Kotschubey et al. | 346—78 |
| 3,003,842 | 10/61 | Langford et al. | 346—104 |
| 3,020,116 | 2/62 | Pudelko | 346—146 |
| 3,050,682 | 8/62 | Szymezak et al. | 346—107 X |

LEYLAND M. MARTIN, *Primary Examiner.*

LEO SMILOW, *Examiner.*